United States Patent [19]

Nordby

[11] 4,080,554
[45] Mar. 21, 1978

[54] VARIABLE FREQUENCY STATIC MOTOR DRIVE

[75] Inventor: Craig J. Nordby, Cheektowaga, N.Y.

[73] Assignee: Westinghouse Electric Corporation, Pittsburgh, Pa.

[21] Appl. No.: 673,564

[22] Filed: Apr. 5, 1976

[51] Int. Cl.² .............................................. H02P 5/40
[52] U.S. Cl. .................................. 318/227; 318/230; 318/231; 363/96
[58] Field of Search ...................... 318/227, 230, 231; 321/5, 9, 18, 27; 363/95-98, 135, 136

[56] References Cited

U.S. PATENT DOCUMENTS

| | | | |
|---|---|---|---|
| 3,467,904 | 9/1969 | Studtmann et al. | 318/231 X |
| 3,491,282 | 1/1970 | Heinrich et al. | 321/9 R X |
| 3,560,834 | 2/1971 | Studtmann | 318/231 X |
| 3,584,279 | 6/1971 | Kranthamer et al. | 318/227 |

Primary Examiner—Gene Z. Rubinson
Attorney, Agent, or Firm—C. M. Lorin

[57] ABSTRACT

A variable speed static controlled induction motor is voltage regulated under variable frequency by controlling the inverters under constant pulse width while maintaining a constant volt-hertz ratio through the feedback voltage control loop.

2 Claims, 14 Drawing Figures

| TRANSFORMER | WINDING | RELATIVE RATED VOLTAGE |
|---|---|---|
| TM | T1 | $\sqrt{3}$ |
| TM | T2 | $2\sqrt{3}$ |
| TM | T3 | $\sqrt{3}$ |
| TN | T1 | 3.0 |
| TN | T2 | 3.0 |
| TO | T1 | $2\sqrt{3}$ |
| TO | T2 | $\sqrt{3}$ |
| TO | T3 | $\sqrt{3}$ |
| TP | T1 | 3.0 |
| TP | T3 | 3.0 |
| TQ | T1 | $\sqrt{3}$ |
| TQ | T2 | $\sqrt{3}$ |
| TQ | T3 | $2\sqrt{3}$ |
| TR | T2 | 3.0 |
| TR | T3 | 3.0 |

VARIABLE FREQUENCY STATIC MOTOR DRIVE

BACKGROUND OF THE INVENTION

The invention relates to variable speed alternating current motor drives in general, and more particularly to static controlled variable frequency power supply for such motor drives. Typically, for such application the frequency of the supplied alternating current must be varied from 6 hertz to 240 hertz.

The invention is best suited for a polyphase alternating current power supply generated from a direct current source by controlled conduction of power rectifiers, such as thyristors, mounted in an inverter circuit. A sinusoidal waveform is constructed from a predetermined number of square pulses of voltage having selected magnitudes. This technique called "harmonic neutralization" is described in U.S. Pat. No. 3,491,282 of T. M. Heinrich et al, entitled "Static Inverter Wherein A Plurality Of Square Waves Are So Summed As To Produce A Sinusoidal Output Wave". The technique consists in generating with inverters a plurality of pulses of the same amplitude, at the same repetitive rate, spaced from each other between stages of inverters by the same electrical angle. The pulses are amplified by respective stage transformers having winding ratios which follow the cosine law from one to the other. The secondary windings are connected in series so as to sum the dimensioned pulses and a polyphase output waveform is obtained by vector addition of transformer secondaries. The Heinrich Patent also describes how the AC output voltage of such a static generator can be controlled by varying the time of conduction of the thyristors in the inverters of each stage. Two main modes of controlling the output voltage are disclosed in the Heinrich Patent. One mode uses pulse width modulation; the second mode uses pulse phase shifting. Either mode provides an adjustment of the conduction angle, e.g., of the width of the outputted dimensioned square waves appearing in the primaries of the dimensioning transformers. It has been shown that, for the practical range of voltage control with such a method the quality of the constructed sinusoidal wave is not lost, e.g., "harmonic neutralization" is maintained.

While the frequency of operation of the inverters in the Heinrich apparatus determines the fundamental frequency of the outputted alternating current, varying the switching frequency of the inverters will vary the frequency of the generated AC current.

It is known that variable frequency motor drives in general operate under a constant volt - hertz ratio. This condition optimizes the operation of the AC motor supplied with AC current. On the one hand, the induction motor preferably should be operating under an optimum flux level, e.g., the magnetizing force is kept constant when the frequency varies. Since the magnetizing flux is proportional to voltage and inversely proportional to frequency, the condition is achieved by varying the voltage in the same proportion as does the frequency. On the other hand, with inverters having a controlled time of conduction of the DC energy supplied to the AC motor in either direction, such time of conduction becomes larger for a given time interval when the frequency increases, and so does the voltage output. Conversely, the voltage decreases when frequency decreases. Therefore, by keeping the controlled time of conduction constant the requirement that voltage follow frequency variations is automatically respected as frequency varies. This is also generally known.

However, any variable frequency motor drive must also be voltage regulated. This may be necessary in order to follow the load demand. The DC link with the inverter may also be causing AC output voltage variations. Start up conditions is another situation demanding voltage control. Whenever voltage control is concurrently effected with frequency changes, one corrective loop may be interacting with the other.

An object of the present invention is to provide a variable frequency motor drive in which voltage control is unaffected by change in frequency.

Another object of the invention is to provide voltage control in which voltage variations due to frequency are automatically compensated during control.

Still another object of the invention is to provide static controlled motor drive operating under constant volt per hertz conditions.

SUMMARY OF THE INVENTION

A frequency and voltage controlled AC static power source for supplying energy at variable frequency and output voltage which is dependent upon frequency to an AC load comprising a closed votlage control loop including means for generating a frequency dependent corrective function, whereby the voltage control loop of said static power source is independent of frequency and the frequency of said AC load is adjusted in an open loop.

BRIEF DESCRIPTION OF THE DRAWINGS

FIG. 11 shows specific circuitry used for the function generator and voltage regulator of FIG. 6.

DESCRIPTION OF THE PREFERRED EMBODIMENTS

Figure 1:
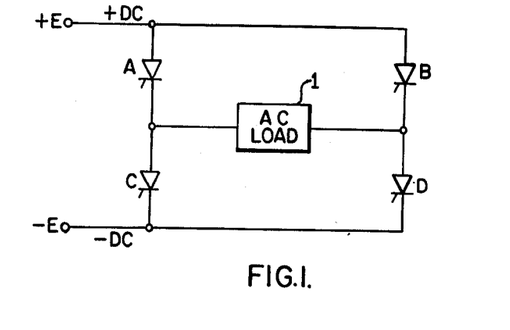
FIG. 1 is a schematic representation of an inverter coupled between a DC source and an AC load.
Figure 2:
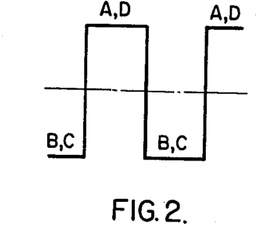
FIG. 2 typically shows as a function of time AC voltage generated by the inverter of FIG. 1.
Figure 2:
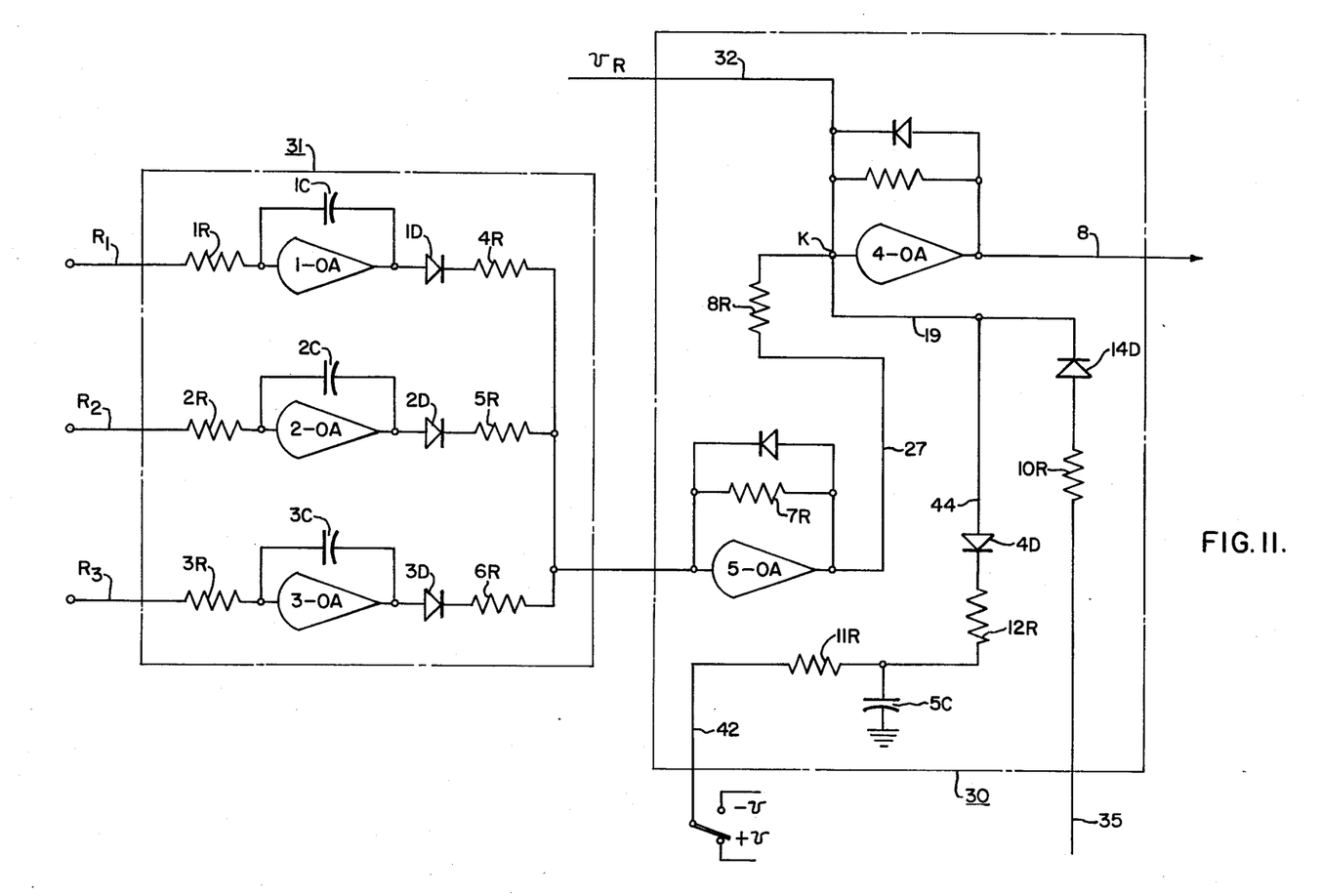

FIG. 1 is a simplified schematic representation of an inverter circuit using thyristors A, B, C, D as power switching devices connected between the direct current terminals of a DC source having $+E$ volts and $-E$ volts polarities. The alternating current load 1 is alternatively traversed by energy in either direction via pairs of thyristors B,C and A,D as shown in FIG. 2 thereby to generate alternating current.

Control of the voltage at the output of the inverter is schematized by FIGS. 3A-3D and 4.

Figure 3A:
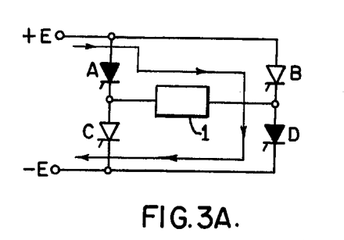
FIGS. 3A-3D illustrate the operation of the inverter of FIG. 1 for voltage control.
Figure 3B:
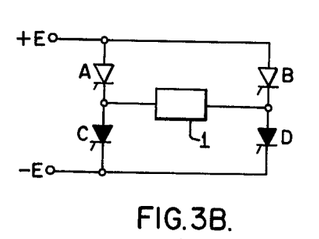
Figure 3C:
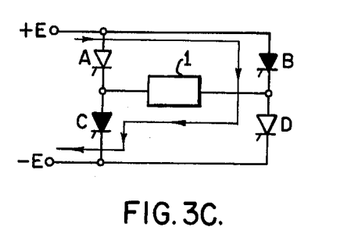
Figure 3D:
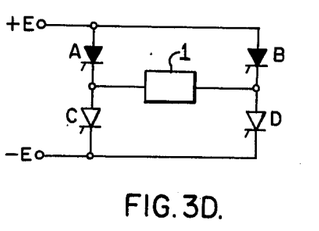
Figure 4:
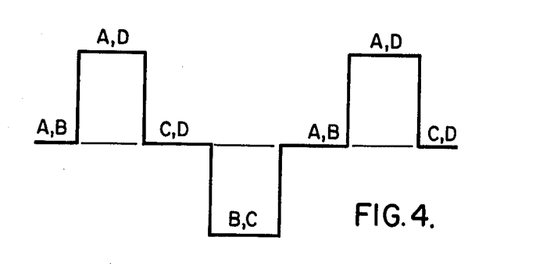
FIG. 4 is the AC voltage generated during pulse width control.

By controlling the time of conduction of thyristors A,D according to the scheme of FIGS. 3A-3D controlled times of conduction (A,D) and (B,C) are obtained representing passage of energy through the load in one and the other direction, as shown in FIG. 4. The overall waveform represents voltage across the load. FIG. 3A shows the positive half cycle (A,D). FIG. 3B illustrates zero voltage due to thyristors C and D being conducting to apply the same voltage at both ends of the load. FIG. 3C shows the negative half cycle (B,C). FIG. 3D is the zero votlage conduction due to concurrent firing of thyristors A,B. This is generally known as voltage control by adjusting pulse width.

Figure 5:
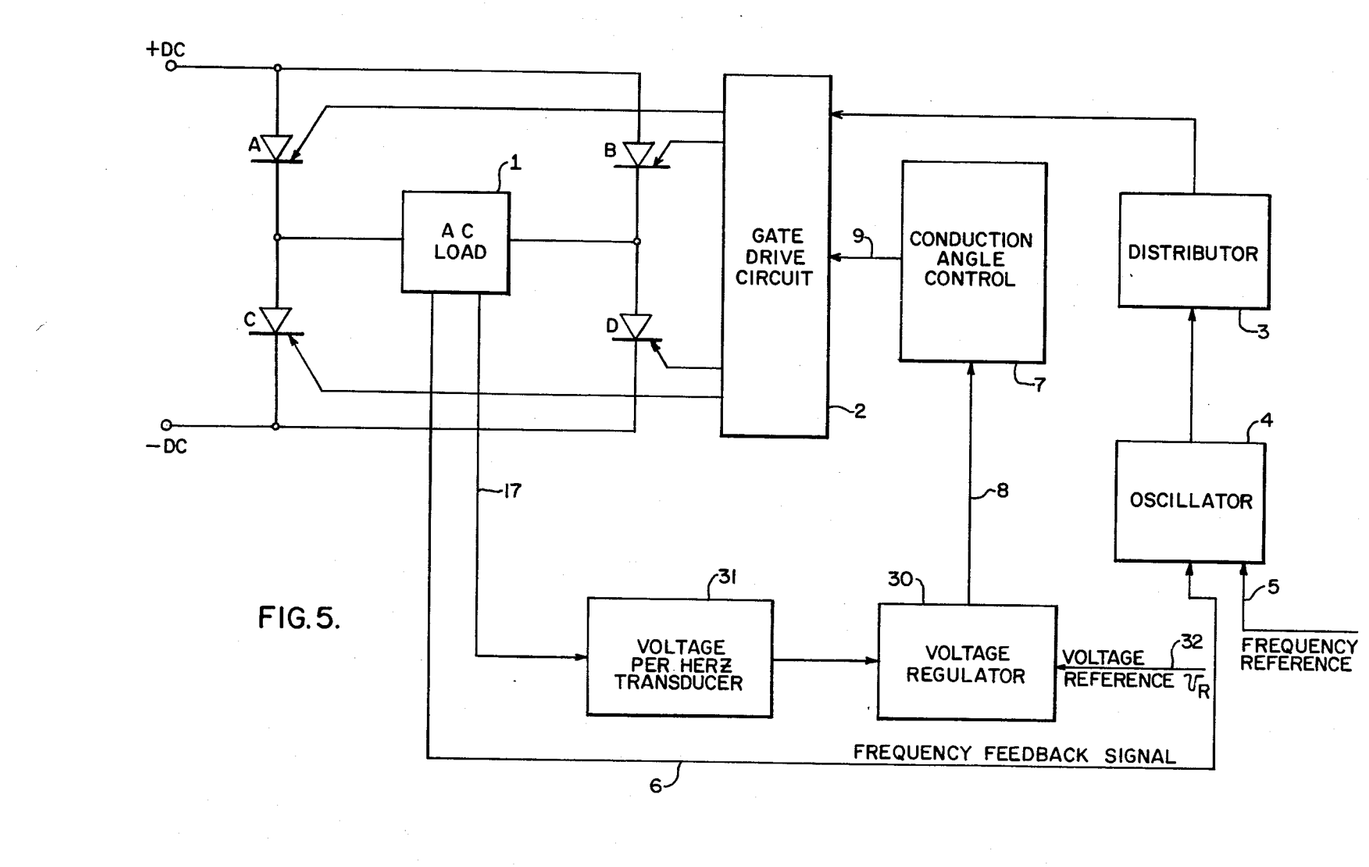
FIG. 5 is a schematic representation of the improved inverter voltage control system according to the invention.

Referring to FIG. 5, the embodiment of the invention is schematically shown to include an inverter circuit such as the one of FIG. 1, coupled to a load 1 and controlled for variable frequency of operation while being voltage regulated. Thyristors A to D are selectively cyclically and sequentially fired by a gate drive circuit 2 in accordance with the logic of a distributor 3 having a cycle frequency defined by an oscillator 4. The frequency of the oscillator is adjusted at various settings by a frequency reference on line 5. If necessary a frequency feedback signal derived from load 1 is applied via line 6 to the oscillator for regulation purpose. A conduction time control circuit 7 is connected to the gate drive circuit 2 in order to establish a desired pulse width of the output wave as shown by reference to FIG. 4, thereby to control the voltage across the AC load. A voltage regulator 30 is connected in a close voltage control loop comprising a voltage per hertz transducer 31 responsive to a feedback voltage signal derived from the load on line 17. The voltage regulator 30 generates a voltage control signal applied via line 8 to the conduction time control circuit 7.

Assuming the frequency of operation constant, any change in the feedback signal of line 17 yields a change in the voltage control signal on line 8 thereby to effectively cause a change in the conduction time, e.g., the electric angle during which DC energy is passing through the load via conducting thyristors, namely, (A,D) or (B,C) on FIG. 4. When the frequency of the oscillator is varied, since the time scale of the wave of FIG. 4 varies with frequency, for the same $\Delta t$ control condition on lines 8 and 9 to the gate drive circuit 2, the electric angle of conduction of the thyristor is no longer the same, e.g., there is constant pulse width. This observation should be born in mind when considering hereinafter the so-called constant pulse width operation condition. As eariler mentioned, when the AC load is an induction motor, it is desirable to keep constant flux condition in the motor at all speeds by keeping constant the ratio between the voltage and the frequency of operation of the motor. Referring again to FIG. 4, it is seen that for the same pulse width on lines 8 and 9 the votlage of the AC motor increases when frequency increases, and conversely, if voltage decreases frequency decreases. Therefore, it can be said that when controlling the inverters under a constant pulse width for all frequencies the system will automatically establish on the motor the operating requirement of constant volt per hertz. However, this very condition reacts on circuit 7 since the voltage feedback control loop has become sensitive to such spontaneous voltage adjustments to frequency changes.

To cope with the problem an approach would be to inject on line 32 a voltage reference which is inversely proportional to frequency. Such method, in fact combines a close frequency loop with a closed voltage loop.

The present invention provides automatic correction of voltage feedback to compensate for frequency variation by introducing in the close voltage loop a volt per hertz transducer 31. As a result, control by the voltage regulator 30 becomes insensitive to frequency variations. The voltage reference $V_R$ on line 32 becomes a constant reference.

Figure 6:
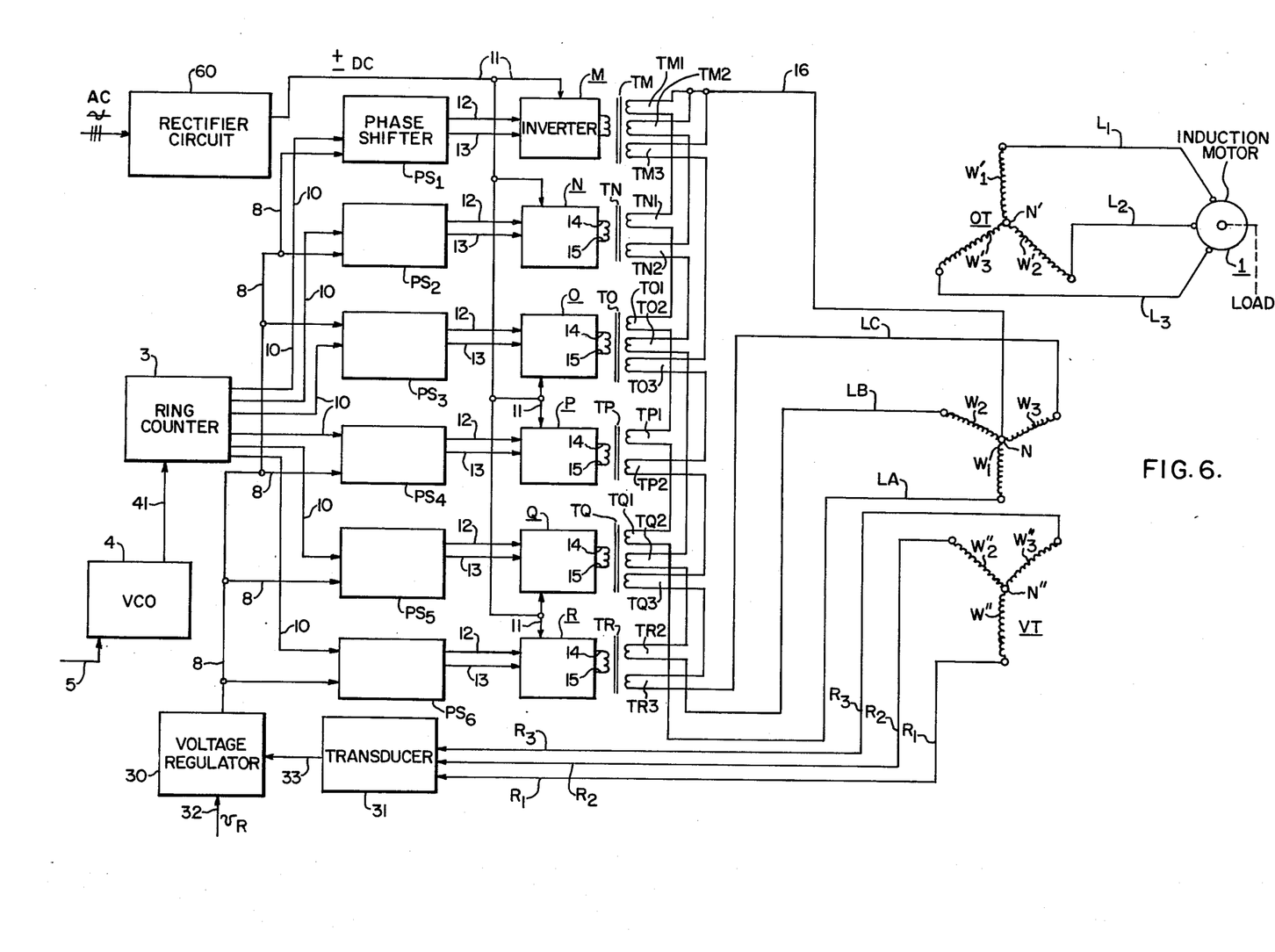
FIG. 6 illustrates the invention in the context of an harmonic neutralization converter system.

Referring to the drawings, FIG. 6 is a schematic block diagram of a DC to AC converter of the type disclosed in the aforementioned U.S. Pat. No. 3,491,282 of T. M. Heinrich et al, embodying voltage control in accordance with the present invention.

Typically, the DC to AC converter of FIG. 6 uses six inverter stages M-R for harmonic neutralization. Each inverter is supplied via line 11 with direct current voltage derived from a rectifier circuit 60 converting the 60 hertz AC power supply into direct current voltage. The inverters are sequentially and cyclically controlled by output signals on lines 12, 13 from respective phase shifters $PS_1$, $PS_2$, $PS_3$, $PS_4$, $PS_5$ and $PS_6$, which are also sequentially and cyclically activated by a ring counter 3 outputting triggering control signals in a multiplex fashion via lines 10. The ring counter 3 serves as a distributor for the phase shifters $PS_1$-$PS_6$, and, indirectly, for the inverters M-R. The frequency of the ring counter is determined by a voltage controlled oscillator (VCO) 4 applying a frequency control sigal on line 41 thereto.

Figure 7:
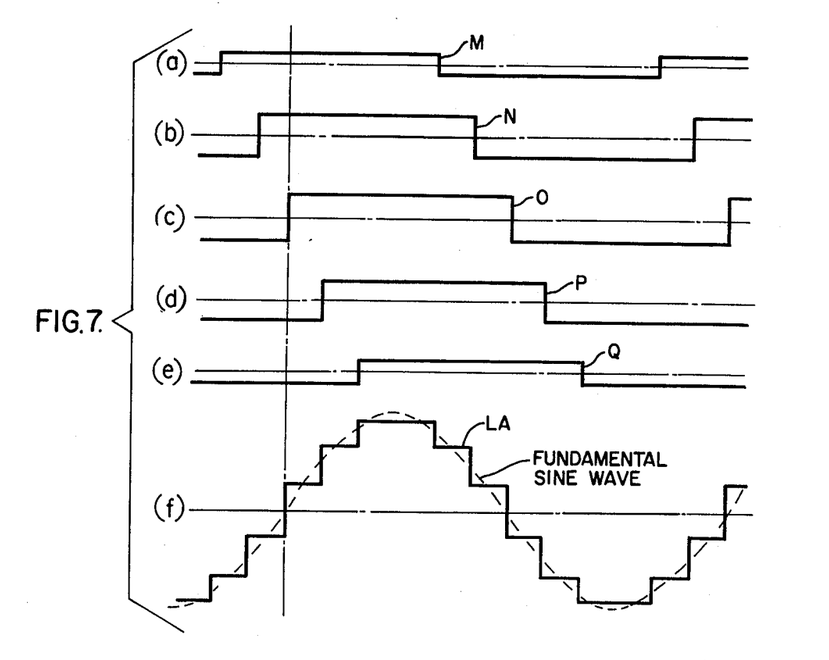
FIG. 7 shows curves used to construct a fundamental sinusoidal output wave with the system of FIG. 6.
Figure 8:
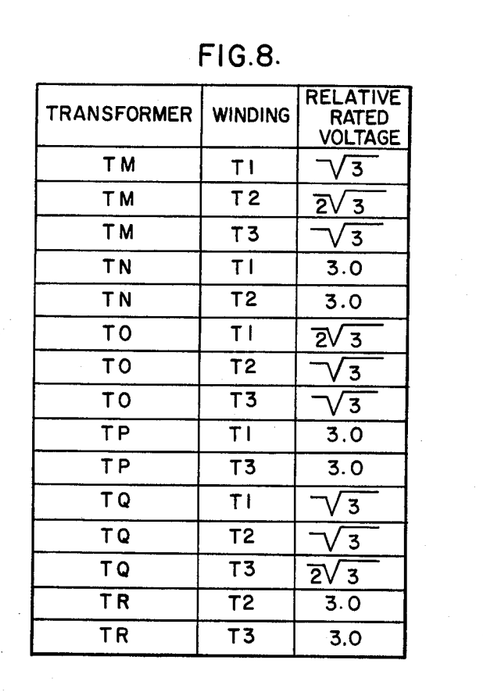
FIG. 8 is a table of the dimensioning transformer ratios used in the embodiment of FIG. 6.
Figure 9:
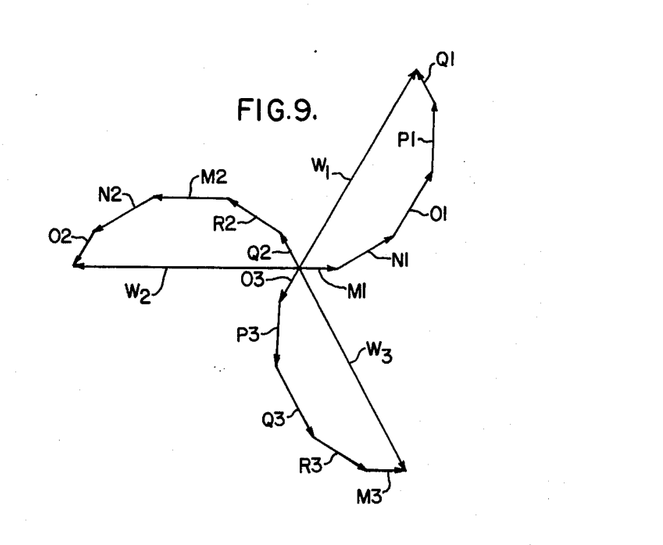
FIG. 9 is a vectorial representation of the three phase voltage outputted by the circuit of FIG. 6.

In accordance with the teachings of the Heinrich Patent, inverters M-R generate at their respective outputs 14, 15, identical square pulses which are shifted by a phase angle the same between each stage. For the purpose of this disclosure the description of the U.S. Pat. No. 3,491,282 of T. M. Heinrich is incorporated by reference therein. As disclosed in the Heinrich Patent, the square waves generated between lines 14, 15 are amplified by respective transformers (TM-TR). The dimensioning ratios of the transformers follow a cosine law from one stage to the next and the secondary windings of the transformers are combined in series so as to sum the dimensioned square waves and form a sinusoidal wave shown like the one at (b) in FIG. 7 for phase A and output line $L_A$. Typically, with six stages, only five windings TM, TN, TO, TP, TQ are serially connected to privide the sinusoidal wave of one phase. Thus, windings $TM_1$, $TN_1$, $TO_1$, $TP_1$ and $TQ_1$ generate the sinusoidal wave applied to winding $W_1$ between line $L_A$ and neutral point N, for phase A. In the same fashion, for phase B, windings $TM_2$, $TW_2$, $TO_2$, $TQ_2$ and $TR_2$ are serially connected to supply winding $W_2$ with a sinusoidal wave at 120° from winding $W_1$. The third phase $W_3$ is supplied by serially connected windings $TM_3$, $TO_3$, $TP_3$, $TQ_3$ and $TR_3$, respectively. These windings $W_1$, $W_2$, $W_3$ are the primary windings of an output transformer OT. The ratios of the windings of transformers TM, TN, TO, TP, TQ and TR are indicated in a table shown on FIG. 8. FIG. 9 shows graphically how the five vectors dimensioned in accordance with the table are summed up by the serially connected secondary windings, for each phase. The primary winding $W_1$ of the three phase output transformer OT is connected between line $L_A$ and connection 16 to neutral point N. Similarly, windings $W_2$, $W_3$ are connected between neutral N and lines $L_B$, $L_C$ respectively. In FIG. 7, the fundamental sine wave generated for phase A between line $L_A$ and neutral N is shown by reference to the dimensioned square wave (a) to (e) derived from inverters M, N, O, P and Q in accordance with the table of FIG. 8. The secondary of output transformer OT includes windings $W_1'$, $W_2'$, $W_3'$ which supply AC power via lines $L_1$, $L_2$, $L_3$ to the load, namely an induction motor. The motor is operated at variable frequency adjusted by changing the setting of a voltage control oscillator 4 controlling the frequency of ring counter 3. The frequency of the VCO is set by a reference signal on line 5 and regulated if desired by a feedback signal derived from a tachometer coupled on the axis of the motor.

The output voltage on lines $L_A$, $L_B$, $L_C$ depends on the width of the individual square pulses which, as shown in FIG. 7 for phase A, build up the fundamental sine wave. Voltage control has been described in the aforementioned United States Patent of Heinrich, and in the paper entitled "Static Inverter With Neutralization Of Harmonics" by A. Kernick, J. L. Roof and T. M. Heinrich presented at the AIEE Aero-Space Transporation Conference in Philadelphia, June 26-30, 1961.

While voltage control has been disclosed in the patent either by pulse width modulation or by phase shift modulation, FIG. 6 illustrates an embodiment of the invention with phase shift modulation. Voltage transformer VT provides between the secondary windings $W_1''$, $W_2''$, $W_3''$ and lines $R_1$, $R_2$, $R_3$ voltage feedback signals which are applied to a voltage regulator 30 in order to adjust the output voltage on lines $L_A$, $L_B$, $L_C$ in relation to a reference voltage $v_R$ also applied to the voltage regulator 30. According to the present invention a transducer 31 is inserted in the voltage regulating loop, as explained hereinafter.

The ring counter circuit 3 determines the firing sequence of thyristors conventionally connected in the DC link as part of inverters M-R. The conduction pattern determines the output waveforms. The signal input on line 41 is a train of pulses from the VCO, as shown by curve (g) in FIG. 10. The output signals on multiplex lines 10 consist of 6 symmetrical square waves, at 1/6 the input pulse frequency, phase staggered to each other by a fixed phase angle $\pi/3$ (curve (h) in FIG. 10).

Figure 10:
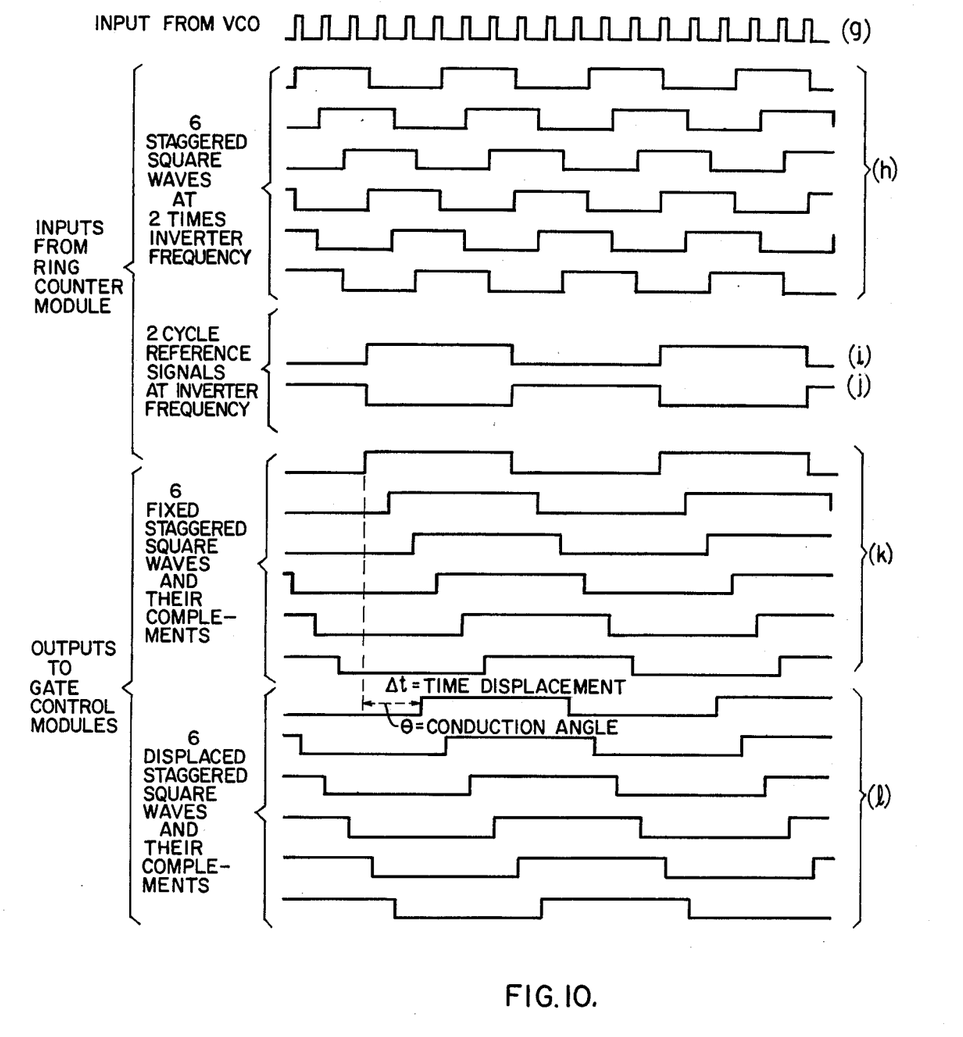
FIG. 10 shows square waves operating on the ring counter of the phase shifters of FIG. 6 to generate the output waves of FIG. 7.

The phase shifters $PS_1$-$PS_6$ employ the "time phase" type of logic. The role of these circuits is to control the time duration in which the voltage is applied to the load in each power stage (conduction angle), and to ensure that this control is performed in an identical manner for each stage. The outputs on lines 12, 13 are the direct and shifted logic command signals to the gate control of the inverters which determine $\Delta t$ (see curves (k) and (l) on FIG. 10). The magnitude of $\Delta t$ depends on the magnitude of the signals on lines 8 issued from the voltage regulator 30. For constant pulse width operation a predetermined conduction angle is established for all inverters e.g. the time shift $\Delta t$ between the direct and shifted signals of lines 12, 13 is fixed by the signal on line 8. FIG. 10 shows the input and output logical waveforms to the phase shifter circuits in a typical 6-stage system. Two cycle reference signals (i) and (j) at the inverter frequency determine the phase of six staggered square waves (k). The voltage between lines 12, 13 determine the time displacement $\Delta t$ of six staggered square waves (l) relative to the (k) waves. The time displacement $\Delta t$ has an operative range of at least 10 to 1, need for soft start requirements. The resolution to which the controllable time displacement is operative exceeds 1 percent of the range.

Referring to FIG. 11, voltage signals on lines $R_1$, $R_2$, $R_3$ are fed at the input of respective operational amplifiers 1-OA, 2-OA, 3-OA. These signals represent the voltage at the output for each phase of the inverter system of FIG. 6. Amplifiers 1-OA, 2-OA and 3-OA are mounted as integrators, as it appears from feedback capacitors 1C, 2C, 3C and input resistors 1R, 2R, 3R. It is recalled from the preceding discussion of the voltage control loop in which transducer 31 and voltage regulator 30 are inserted, that the feedback signal is proportional to frequency, e.g., when frequency increases, the voltage increases in the same proportion. Moreover, the feedback signal on $R_1$, $R_2$ or $R_3$ is sinusoidal at the frequency of operation of the system. Therefore, as a result of the integrating step, operational amplifier 1-OA, 2-OA or 3-OA in fact introduces at the output of coefficient which is inversely proportional to frequency, thus cancelling the effect of the undesirable coefficient present at the input. The integrated value represents a volt per hertz feedback signal. These feedback signals are each rectified by diodes 1D, 2D, and 3D, respectively. Then they are summed up by operational amplifier 50A after respective resistors 4R, 5R and 6R. The average volt per hertz feedback signal appears at the output on line 27. The output of amplifier 5-OA is connected via line 27 and resistor 8R to the summing input K of operational amplifier 4-OA. At summing point K is also applied the voltage reference signal $v_R$ received on line 32. The error between the signal reference $v_R$ on line 32 and the feedback signal on line 27 is amplified by amplifier 4-OA. The output of operational amplifier 4-OA is connected to line 8 providing the voltage control signal which determines the pulse width of the invertor outputs (FIG. 6). It appears that when frequency increases, as a result of constant pulse width operation, the output voltage of the inverter stages increases substantially proportionately, to frequency. However, such increase which is substantially proportional to frequency is corrected in the feedback loop by transducer 31. Therefore, the voltage error at junction K against the constant reference $v_R$ is unaffected by frequency changes. Indeed, the output voltage being a sinusoidal function of the electrical conduction angle of the inverters, a small corrective action, actually, would be necessary in order to have a true constant volt per hertz operation. Thus additional, but minor correction, is provided by the inherent characteristic of the voltage control loop. Should the inverter loading, or the DC link of the inverter stages cause an increase of voltage at the output, the feedback loop will bring about a corrective change at the output of operational amplifier 5-OA. A more negative excursion of the feedback signal against $v_R$ will cause a more positive output on line 27 which will cause corrective action via line 8 to reduce pulse width and establish the correct output voltage for the induction motor.

The circuit of FIG. 11 also provides for a boost voltage at the junction point K of operational amplifier 4-OA. The boost voltage is received at K via diode 14D, resistor 10R and line 35. Such boost signal is applied when the system is operating at relatively low frequency in order to increase the capability of the motor at such low performance levels.

Another feature provided by the circuit of FIG. 11 is to be found at the input 42 which supplies energy to a time basis comprising capacitor 5C and resistor 11R. Capacitor 5C is connected to ground and to the cathode of a clamping diode 4D via a resistor 12R. The anode of diode 4D is connected via lines 44 and 19 to junction K at the input of operational amplifier 4-OA. The circuit just described is used for startup of the inverter stage. The reason is that a feedback signal at startup must be applied only progressively to the normal operative level. Therefore, a time basis is used to create progressive build up until the proper level has been reached. To this effect, on line 42 a voltage of $-v$ is applied at the moment of startup, which will take all the time defined by the time constant before it is fully applied to the cathode of clamping diode 4D. During that time diode 4D is conductive and a small voltage build-up, progressively more positive is applied via diode 4D to the input of amplifer 4-OA, resulting in increased pulse width for the inverter stages. When the voltage build up through the feedback loop has reached a higher level than K, clamping diode 4D cuts off and the startup voltage from line 42 is no longer applied. In order to shut off the operation of the voltage control loop the voltage on line 42 is brought back from $+v$ to $-v$ volts.

I claim:

1. A variable frequency static induction motor drive comprising: a source of direct current voltage, inverter means connected between said direct current voltage source and an induction motor for supplying an alternating current voltage thereto, first control means for controlling said inverter means in relation to frequency for regulating the speed of said motor, second control means responsive to the time integral of said alternating current voltage and operative with said inverter means for establishing a predetermined level for said alternating current voltage while keeping the volt per hertz constant.

2. The motor drive of claim 1 with said second control means being operative on the conduction angle of said inverter means and establishing a constant pulse width at the output of said inverter means.

* * * * *